US012754711B2

(12) United States Patent
Sabi et al.

(10) Patent No.: US 12,754,711 B2
(45) Date of Patent: Oct. 6, 2026

(54) AUDIO DEVICE, PROGRAM, AND CONTROL METHOD

(71) Applicant: AlphaTheta Corporation, Yokohama (JP)

(72) Inventors: Toshihisa Sabi, Yokohama (JP); Hideki Miyata, Yokohama (JP); Toshiki Nakai, Yokohama (JP); Nao Takagi, Yokohama (JP); Shintaro Kido, Yokohama (JP)

(73) Assignee: AlphaTheta Corporation, Yokohama (JP)

( * ) Notice: Subject to any disclaimer, the term of this patent is extended or adjusted under 35 U.S.C. 154(b) by 219 days.

(21) Appl. No.: 18/711,784

(22) PCT Filed: Nov. 21, 2022

(86) PCT No.: PCT/JP2022/043067
§ 371 (c)(1),
(2) Date: May 20, 2024

(87) PCT Pub. No.: WO2023/090450
PCT Pub. Date: May 25, 2023

(65) Prior Publication Data

US 2025/0021297 A1 Jan. 16, 2025

(30) Foreign Application Priority Data

Nov. 22, 2021 (WO) .................. PCT/JP2021/042839

(51) Int. Cl.
*G06F 3/16* (2006.01)
*G06F 3/14* (2006.01)
(Continued)

(52) U.S. Cl.
CPC ................ *G06F 3/165* (2013.01); *G06F 3/14* (2013.01); *G10H 1/0008* (2013.01); *G10K 15/02* (2013.01);
(Continued)

(58) Field of Classification Search
CPC ......... G06F 3/165; G06F 3/14; G10H 1/0008; G10H 2210/125; G10H 2220/106;
(Continued)

(56) References Cited

U.S. PATENT DOCUMENTS 9,111,519 B1 * 8/2015 Yang ........................ G10H 1/40
10,445,056 B1 * 10/2019 Morris .................... G10L 25/57
(Continued)

FOREIGN PATENT DOCUMENTS

JP 2009-217079 A 9/2009
JP 2021-145838 A 9/2021
WO 2019/130595 A1 7/2019

OTHER PUBLICATIONS

International Preliminary Report on Patentability dated May 2, 2024, Application No. PCT/JP2022/043067; 4 pages.
(Continued)

*Primary Examiner* — Stella L. Woo
(74) *Attorney, Agent, or Firm* — Rankin, Hill & Clark LLP

(57) ABSTRACT

An acoustic device configured to mix two or more music pieces is provided. The acoustic device includes a display controller configured to switchably display information related to audio mixing on a display device; and a reservation unit configured to set the music pieces to be mixed and a playback start point in each of the music pieces. The display controller is configured to switchably display on the display device a first screen, on which a first image indicating a playback status of a first music piece being played
(Continued)

is moved based on a second image indicating a current playback point of the first music piece, and a second screen, on which the first image is fixedly displayed and the second image is moved based on the first image in accordance with the current playback point. The second screen includes a reservation-setting screen related to the reservation unit.

15 Claims, 10 Drawing Sheets

(51) Int. Cl.
*G10H 1/00* (2006.01)
*G10K 15/02* (2006.01)

(52) U.S. Cl.
CPC . *G10H 2210/125* (2013.01); *G10H 2220/106* (2013.01); *G10H 2220/116* (2013.01)

(58) Field of Classification Search
CPC ....... G10H 2220/116; G10H 2240/325; G10H 1/46; G10K 15/02; H04R 3/00
See application file for complete search history.

(56) References Cited

U.S. PATENT DOCUMENTS

| | | | | |
|---|---|---|---|---|
| 10,496,199 | B2 * | 12/2019 | Mazur | G06F 3/041 |
| 2008/0013757 | A1 * | 1/2008 | Carrier | G11B 27/034 381/119 |
| 2014/0288686 | A1 * | 9/2014 | Sant | G11B 27/038 700/94 |
| 2018/0286462 | A1 * | 10/2018 | Becherer | G11B 27/036 |
| 2021/0141592 | A1 * | 5/2021 | Reese | G06F 3/165 |
| 2023/0343314 | A1 * | 10/2023 | Morsy | G10H 1/0025 |

OTHER PUBLICATIONS

International Search Report dated Feb. 14, 2022, Application No. PCT/JP2022/043067; 4 pages.

Native Instruments, "Traktor Pro 3.0", https://www.native-instruments.com/fileadmin/ni_media/downloads/manuals/traktor/TRAKTOR_PRO_3.0_Manual_Japanese_0719.pdf; English translation included; discussed in the specification, 400 pages.

* cited by examiner

AUDIO DEVICE, PROGRAM, AND CONTROL METHOD

TECHNICAL FIELD

The present invention relates to an acoustic device, a program, and a control method.

BACKGROUND ART

Various technologies have been devised in the field of acoustic devices and application software related to Digital Audio Workstation (DAW) and Desk Top Music (DTM). For instance, Non-Patent Literature 1 discloses application software capable of setting a reservation related to audio mixing.

CITATION LIST

Non-Patent Literature(s)

Non-Patent Literature 1: Manual of Traktor Pro 3.0 (produced by Native Instruments) (https://www.native-instruments.com/fileadmin/ni_media/downloads/manuals/traktor/TRAKTOR_PRO_3.0_Manual_Japanese_0719.pdf)

SUMMARY OF THE INVENTION

Problem(s) to be Solved by the Invention

However, such application software is still insufficient to satisfy user's various demands in setting the above-described reservation for mixing.

An object of the invention is to provide an acoustic device, a program, and a control method that enable a user to easily set a reservation even while a music piece is being played.

Means for Solving the Problem(s)

[1] An acoustic device configured to mix two or more music pieces, the acoustic device including: a display controller configured to display information related to mixing of the music pieces on a display device; and a reservation unit configured to set the music pieces to be mixed and a playback start point in each of the music pieces, in which the display controller is configured to switchably display on the display device a first screen, on which a first image indicating a playback status of a first music piece being played of the music pieces is moved based on a second image indicating a current playback point of the first music piece, and a second screen, on which the first image is fixedly displayed and the second image is moved based on the first image in accordance with the current playback point, and the second screen includes a reservation-setting screen related to the reservation unit.

[2] The acoustic device according to [1], in which the first image includes an image indicating a music waveform of the first music]

[3] The acoustic device according to [1] or [2], in which the reservation unit is capable of setting the playback start point of each of the music pieces to be mixed while the first music piece is being played, and the display controller is capable of switching the first screen and the second screen while the first music piece is being played.

[4] The acoustic device according to any one of [1] to [3], in which the reservation unit is configured to set a mixing point on each of the two or more music pieces and set the playback start point in accordance with the mixing point.

[5] The acoustic device according to any one of claims [1] to [4], in which the display controller is configured to display information indicating a playback order of the two or more music pieces in the reservation-setting screen on the display device.

[6] The acoustic device according to [5], in which the display controller is configured to display a character or an icon representing the playback order as the information indicating the playback order on the display device.

[7] The acoustic device according to [5], in which the display controller is configured to display a plurality of images respectively indicating playback statuses of the two or more music pieces on the display device in an arrangement corresponding to the playback order to display the information indicating the playback order.

[8] The acoustic device according to any one of [1] to [7], in which the reservation unit is capable of setting whether to output sounds of the music pieces to be mixed before reaching the playback start point.

[9] The acoustic device according to any one of [1] to [8], in which the display controller is configured to, in execution of a reservation set by the reservation unit, display the first screen on the display device and move a third image indicating time information of the playback start point based on the second image on the first screen.

[10] A program configured to cause a computer to function as the acoustic device according to any one of [1] to [9].

[11] A control method executed using an acoustic device configured to mix two or more music pieces, the control method including: displaying information related to mixing of the two or more music pieces on a display device; and setting the music pieces to be mixed and a playback start point in each of the music pieces, in which in the displaying of the information, a first screen, on which a first image indicating a playback status of a first music piece being played of the music pieces is moved based on a second image indicating a current playback point of the first music piece, and a second screen, on which the first image is fixedly displayed and the second image is moved based on the first image in accordance with the current playback point, are switchably displayed on the display device, and the second screen includes a reservation-setting screen related to the setting of the music pieces and the playback start point.

DESCRIPTION OF EMBODIMENT(S)

Figure 1:
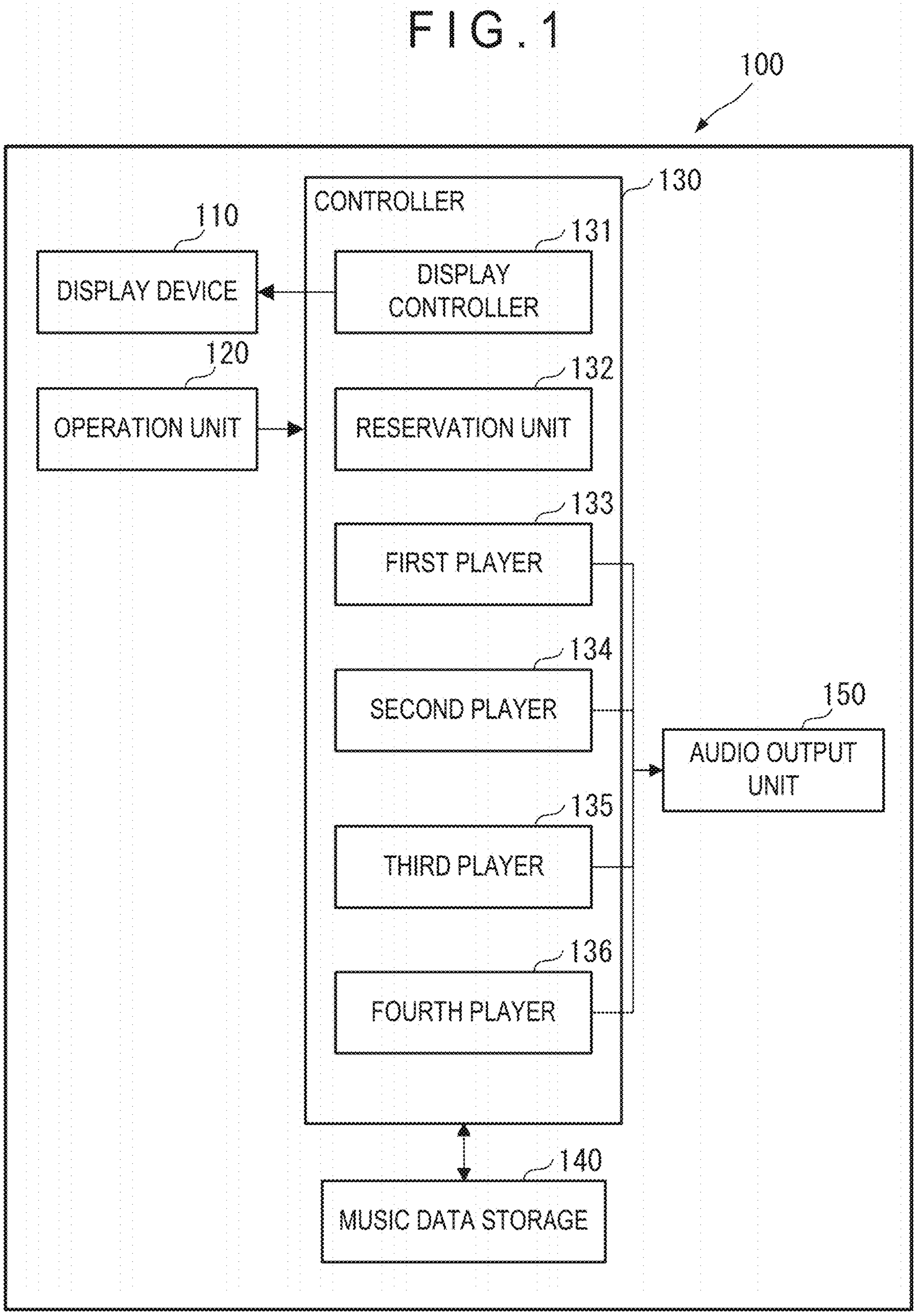
FIG. 1 is a block diagram schematically illustrating a functional arrangement of an acoustic device according to an exemplary embodiment of the invention.

The following describes preferred exemplary embodiments of the invention in detail with reference to the accompanying drawings. It should be noted that components of the same or substantially the same function(s) and structure(s) will be denoted by the same reference numerals in the specification and drawings, omitting repetition of description thereof.

FIG. 1 is a block diagram schematically illustrating a functional arrangement of an acoustic device according to an exemplary embodiment of the invention. The acoustic device according to the exemplary embodiment of the invention may be a player, a mixer that controls a player, an integrated DJ system of a player and a mixer, or an acoustic device using a portable terminal such as a smartphone and a tablet terminal. The invention is also similarly applicable to a DJ controller without playback function.

An acoustic device 100 has a function as a first player (referred to as a DECK 1 hereinafter), a second player (referred to as a DECK 2 hereinafter), a third player (referred to as a DECK 3 hereinafter), a fourth player (referred to as a DECK 4 hereinafter), and a function as a mixer that controls each of the DECKs 1 to 4.

As illustrated in FIG. 1, the acoustic device 100 includes a display device 110, an operation unit 120, a controller 130, a music data storage 140, and an audio output unit 150. The functions of the above units are implemented by, for instance, arranging the acoustic device configured as a computer hardware and operating a processor of the acoustic device in accordance with a computer program. The functions of the above units will be further described below.

The display device 110 displays a screen indicating various information in the acoustic device 100. The display device 110 is exemplified by various devices such as liquid crystal display devices and organic electroluminescent display devices. The display device 110 is optionally configured as a touch panel, which includes operators displayed on a screen and a contact sensor and the like that detects a contact point, to receive a user's operation.

The operation unit 120 receives various user's operations through the operators and outputs information indicating the details of the user's operation to the controller 130. The information indicating the details of the user's operation is delivered to components in the controller 130. Illustration and detailed description of the operation unit 120 will be omitted herein since the operation unit 120 can be provided using various known techniques.

The control unit 130, which is implemented in the acoustic device 100 in a form of, for instance, a communication interface, a processor (e.g. CPU (Central Processing Unit)), and a memory providing a working area, controls the operation of the acoustic device 100. The controller 130 includes a display controller 131, a reservation unit 132, a first playback unit 133, a second playback unit 134, a third playback unit 135, and a fourth playback unit 136, which are implemented by the processor that works in accordance with a program stored in the memory or received through the communication interface.

The display controller 131 displays, on the display device 110, a screen showing various information related to the music pieces to be played by the acoustic device 100.

The reservation unit 132 sets a reservation for mixing music pieces (mixing targets) played by the first to fourth playback units 133 to 136 in response to the user's operation detected by the operation unit 120. Details of setting the reservation will be described later.

The first playback unit 133 decodes the music piece played by the DECK 1 (first player) to generate audio signals and outputs the audio signals to the later-described audio output unit 150. The second to fourth playback units 134 to 136 also decode the respective music pieces played by the respective players to generate audio signals and output the audio signals to the later-described audio output unit 150.

The music data storage 140, which is provided by an HDD (Hard Disk Drive), flash memory, or the like, is capable of storing music data. The music data storage 140 stores music data of a plurality of music pieces in a predetermined format (e.g. MP3 format). The music data includes, in addition to audio information, information on BPM, art work, title, artist name, album title, key, the number of DJ performance, genre, and the like of the music pieces in a form of tag information. The music data stored in the music data storage 140 is associated with a time stamp representing information on playback position.

It should be noted that the acoustic device 100 optionally includes a communication interface (not illustrated), through which music data stored in an external storage, a computer, or the like is imported and stored in the music data storage 140. In this case, the acoustic device 100 does not include the music data storage 140 but the external storage serves as the music data storage 140.

The audio output unit 150 includes an audio output terminal such as speaker terminal or headphone terminal and outputs audio signals, as audio information, of the music pieces have been outputted by any of the first playback unit 133 to the fourth playback unit 136.

It should be noted that a series of processes from a process of generating the audio signals by the decoding by the first to fourth playback units 133 to 136 to a process of outputting the audio signals by the audio output unit 150 as the audio information will be referred to and described as "playback" in the present exemplary embodiment. A case where the audio signals are generated by the decoding by the first to fourth playback units 133 to 136 and the audio information is outputted by the audio output unit 150 will be referred to as a "playback with audio output." A case where the audio signals are generated by the decoding by the first to fourth playback units 133 to 136 but the audio information is not outputted by the audio output unit 150 (i.e. the audio output is muted) will be referred to as a "playback without audio output."

Various display screens related to audio mixing, which is to be displayed on the display device 110 of the above-described acoustic device 100, will be described below.

Figure 2:
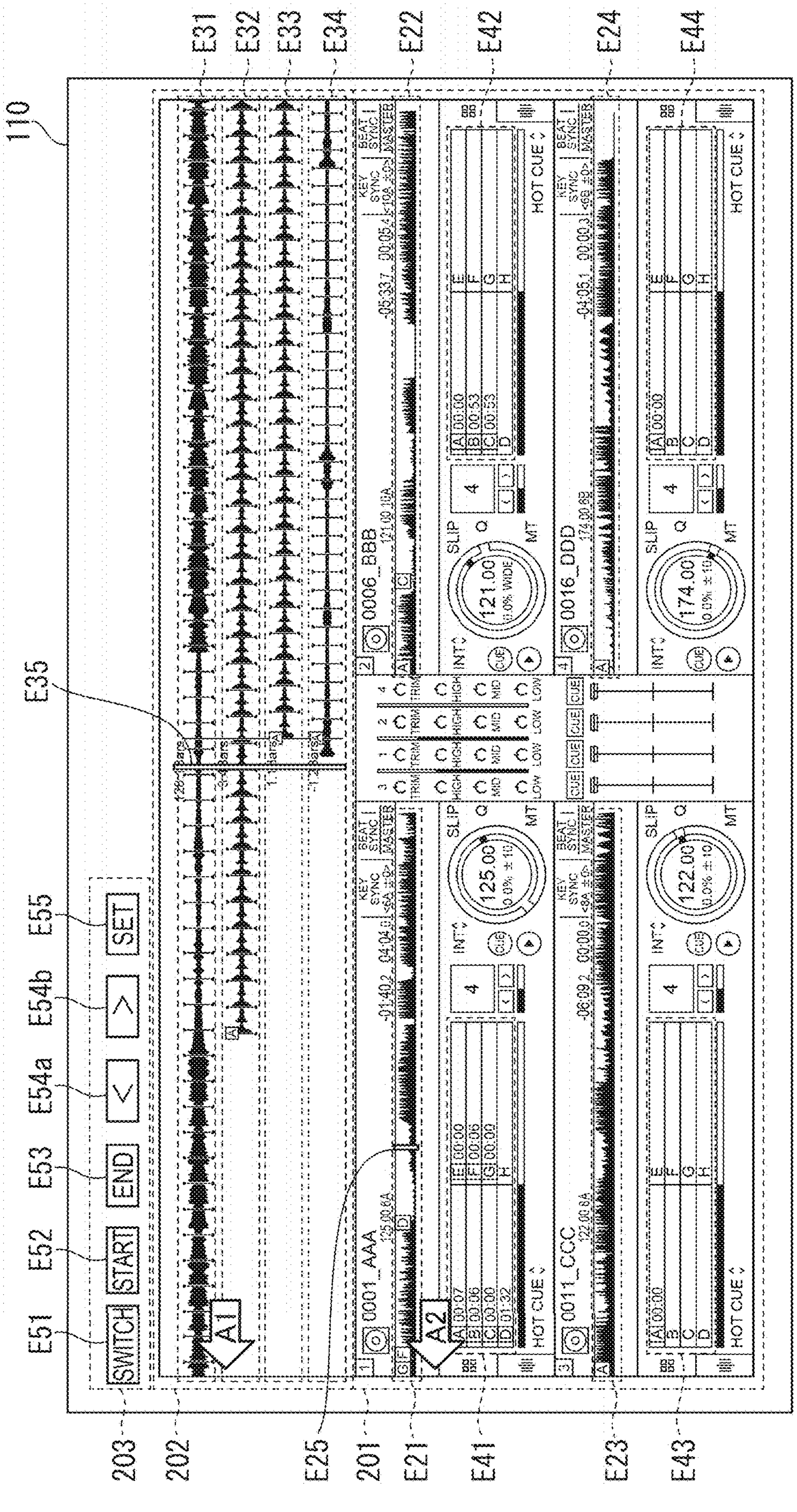
FIG. 2 schematically illustrates an example of a display screen according to an exemplary embodiment of the invention.

FIG. 2 illustrates an example of a usual playback screen. FIGS. 3 to 7 each illustrate an example of a reservation-setting screen for audio mixing. When a user's operation for usual playback is made using the operation unit 120, the display controller 131 displays a playback screen (a display screen for usual playback) as illustrated in FIG. 2 on the display device 110. When a user's operation of switching the screen or setting a reservation for audio mixing is made using the operation unit 120, the display controller 131 displays reservation-setting screens as display screens for setting reservation as illustrated in FIGS. 3 to 7 on the display device 110.

In other words, the display controller 131 switchably displays the playback screen (first screen) and the reservation-setting screens (second screen) on the display device 110. Accordingly, a user can check a usual playback status based on the playback screen illustrated in FIG. 2 and can set a reservation for audio mixing based on the reservation-setting screens illustrated in FIGS. 3 to 7.

Usual Playback Screen

The playback screen illustrated in FIG. 2 includes a display area 201 indicating information on entirety or a part of the music piece, a display area 202 indicating a part of the display area 201 in an enlarged manner, and a display area 203 indicating operators for receiving the user's operation. A case where a music piece is played by the DECK 1 and no music piece is played by the DECKs 2 to 4 will be described below.

In the display area 201, an image in a form of a waveform E21 (first image) indicating time information of an entirety or a part of the music piece being currently played by the DECK 1, an image in a form of a waveform E22 indicating time information of an entirety or a part of the music piece to be played by the DECK 2, an image in a form of a waveform E23 indicating time information of an entirety or a part of the music piece to be played by the DECK 3, and an image in a form of a waveform E24 indicating time information of an entirety or a part of the music piece to be played by the DECK 4 are illustrated. The waveform E21 of the DECK 1 further includes a bar E25 that is an image indicating a current playback point (second image).

It should be noted that the image of each of the waveforms may be generated in advance for each of the music pieces or may be generated in real time based on information after the decoding process by the first to fourth playback units 133 to 136. The same applies to waveforms in the description hereinbelow.

In the display area 202, an enlarged image (first image) in a form of a waveform E31 (i.e. a part of the waveform E21 near the current playback point of the music piece currently played by the DECK 1, which is displayed in the display area 201), an enlarged image in a form of a waveform E32 (i.e. a part of the waveform E22 of the music piece to be played by the DECK 2, which is displayed in the display area 201), an enlarged image in a form of a waveform E33 (i.e. a part of the waveform E23 of the music piece to be played by the DECK 3, which is displayed in the display area 201), and an enlarged image in a form of a waveform E34 (i.e. a part of the waveform E24 of the music piece to be played by the DECK 4, which is displayed in the display area 201) are displayed. A bar E35 that is an image indicating the current playback point of the music piece currently being played by the DECK 1 (second image) is also illustrated.

It should be noted that information indicating so-called CUE POINTs (e.g. preset playback start points and playback standby points of the music pieces of the DECKs) is also illustrated in the display area 201 and the display area 202. Examples of the CUE POINTs include a HOT CUE, from which playback of the music piece immediately starts, and a MEMORY CUE, at which the playback of the music piece is suspended. Such CUE POINTs are optionally set in advance through a so-called preparation work by a user or, alternatively, set as necessary in response to a user's operation while a music piece is being played.

In the example illustrated in FIG. 2, lists E41 to E44 of the HOT CUE each set for the corresponding one of the DECKs are displayed in the display area 201 and icons each corresponding to one of the CUE POINTs are displayed on the waveforms E21 to E24.

Icons each corresponding to one of the CUE POINTs are also displayed on the corresponding one of the waveforms E31 to E34 of the DECKs in the display area 202. Details of the icons will be described later.

Operators including a screen-switching button 51, a start-point setting button 52, an end-point setting button 53, jump buttons 54*a* and 54*b*, a setting button 55, and the like are shown in the display area 203.

The screen-switching button 51 is an operator for receiving a user's operation for switching the above-described usual playback screen and later-described reservation-setting screen. The start-point setting button 52, the end-point setting button 53, the jump buttons 54*a* and 54*b*, and the setting button 55, which are operators used in the later-described reservation-setting screen, will be detailed later.

In the display area 202 in the usual playback screen, the display controller 131 displays the bar E35 (an image indicating the current playback point of the music piece currently being played by the DECK 1) at a fixed predetermined position while displaying the waveform E31 in a manner moving in a left direction on the screen (i.e. the direction indicated by an arrow A1) based on the fixed bar E35 in accordance with the current playback point. Consequently, a user can locate the current playback point of the music piece in view of the waveform E31 of the currently played music piece that is moving in accordance with the playback status.

In contrast, the waveforms E32 to E34 of the music pieces to be played by the DECKs 2 to 4 are fixedly displayed by the display controller 131 in the same manner as the fixed bar E35.

Similarly, also in the display area 201, the display controller 131 displays the waveform E21 of the music piece being played by the DECK 1 in a manner moving in a left direction on the screen (i.e. a direction indicated by an arrow A2) based on the fixed bar E25 in accordance with the current playback point. Consequently, a user can locate the current playback point of the currently played music piece in view of the waveform E21 of the music piece currently played by the DECK 1, which is moving in accordance with the playback status.

Further, the display controller 131 fixedly displays the waveforms E22 to E24 of the music pieces to be played by the DECKs 2 to 4.

It should be noted that, though partially enlarged images of parts of the display area 201 are displayed in parallel in the display area 202 in the example illustrated in FIG. 2, two or more images of waveforms with different magnifications are optionally displayed in a switching manner. For instance, a screen corresponding only to the display area 201 illustrated in FIG. 2 and a screen corresponding only to the display area 202 illustrated in FIG. 2 are optionally displayed in a switching manner. Alternatively, only one of the above screens is optionally displayed. Further, a zooming ratio of the screens is suitably determined and the screens are suitably switched in response to a user's operation through the operation unit 120.

As described above, since the waveform of the currently played music piece is displayed in motion on the playback screen, a user, who sees that the waveform is running, can intuitively recognize that the music piece is being played. Further, the display area 202, in which information before and after the playback point can be checked in detail, is useful in supporting a user's DJ performance and the like.

Reservation-Setting Screen for Audio Mixing

When a user's operation for selecting the screen-switching button 51 in the above-described display area 203 is performed, the display controller 131 displays a reservation-setting screen for audio mixing as illustrated in FIGS. 3-7 on the display device 110.

In response to the user's operation, the reservation unit 132 selects the music pieces to be mixed, determines the playback point (mixing point) at which the music pieces are mixed, and sets the playback start point based on the determined mixing point.

Herein, the playback start point refers to a audio output start point, at which the decoding process by each of the first to fourth playback units 133 to 136 is performed to output audio information from the audio output unit 150. In other words, the playback start point refers to a start point of the playback with audio output.

It should be noted that the reservation unit 132 is optionally configured to set the playback start point of the music piece independently of the mixing point in accordance with a user's operation. Alternatively, the reservation unit 132 is optionally configured to select and use, as the playback start point, at least one of the mixing point, a playback point that is located before the mixing point by a predetermined time, a point that is located before the mixing point and delimits a music piece (e.g. beats and measures), or a start of a music piece.

Figure 3:
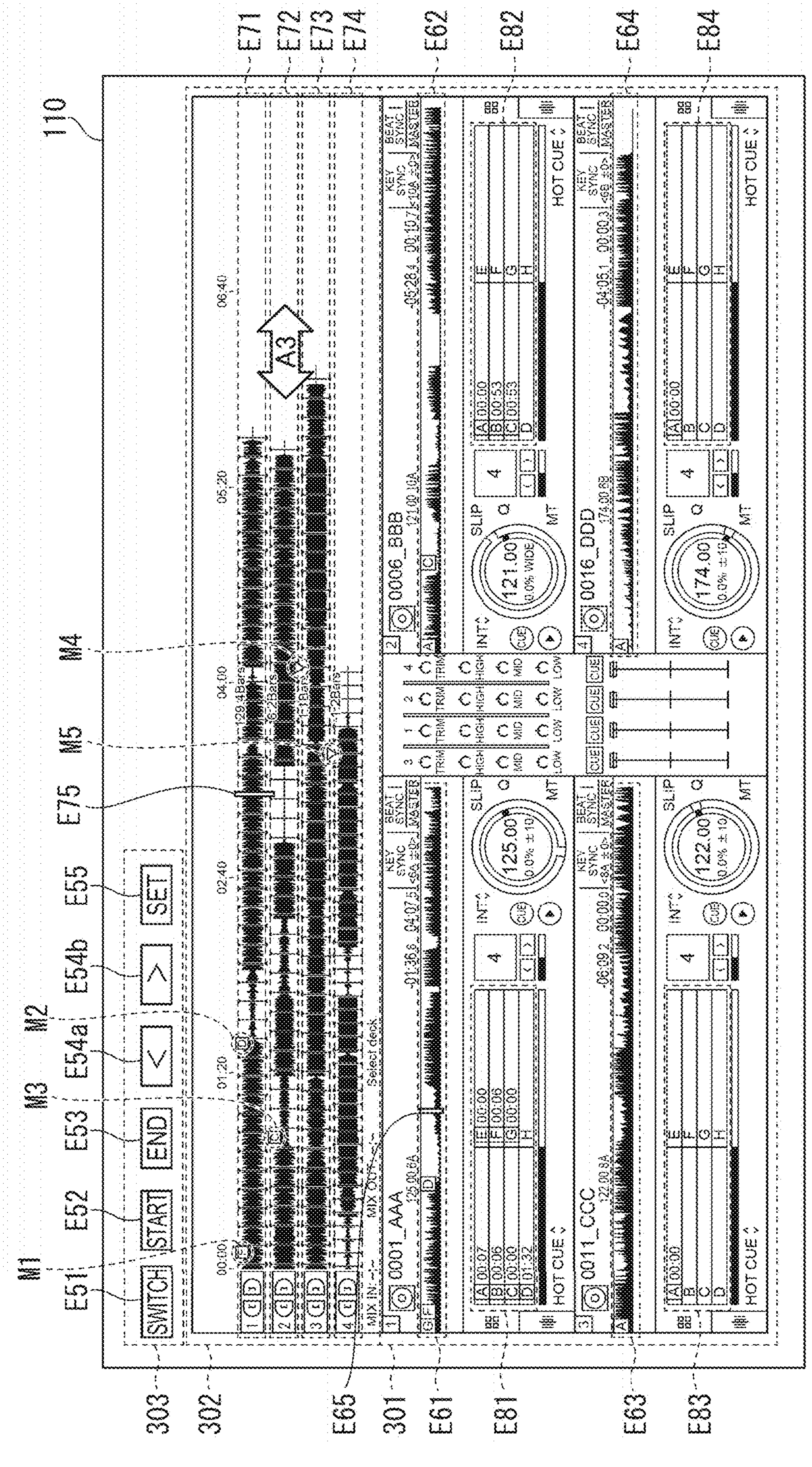
FIG. 3 schematically illustrates another example of the display screen according to the exemplary embodiment of the invention.

The reservation-setting screen illustrated in FIG. 3 includes display areas 301, 302 respectively corresponding to the display areas 201, 202 in the usual playback screen described with respect to FIG. 2, and a display area 303 similar to the display area 203 in the usual playback screen described with respect to FIG. 2. In an example described below, a reservation for audio mixing is set in music pieces to be played by the DECKs 2 to 4 while a music piece is being played by the DECK 1.

A waveform E61 (first image) of an entirety or a part of the music piece currently played by the DECK 1, waveforms E62 to E64 of an entirety or a part of the music pieces to be played by the DECKs 2 to 4, and a bar E65 that is an image (second image) indicating the playback point of the music piece currently played by the DECK 1 are shown in the display area 301.

Images displayed in the display area 302 include a waveform E71 (first image) that is an enlarged image of a part of the waveform E61 of the music piece currently played by the DECK 1 displayed in the display area 301, waveforms E72 to E74 that are each an enlarged image of a part of the corresponding one of the waveforms 62 to 64 of the music pieces to be played by the DECK 2 to DECK 4, and a bar E75 that is an image (second image) indicating the playback point of the music piece currently played by the DECK 1.

It should be noted that information indicating the preset CUE POINTs for the music pieces of the DECKs is also shown in the display area 301 and the display area 302.

In the example illustrated in FIG. 3, lists E81 to E84 of the HOT CUEs that are set in the respective DECKs are shown in the display area 301 in the same manner as in the usual playback screen described with respect to FIG. 2. Icons each corresponding to one of the CUE POINTs are also displayed on the corresponding one of the waveforms E71 to E74 in the display area 302. Icons M1 and M2 corresponding to time information of the HOT CUEs that are set in the music piece played by the DECK 1 and an icon M3 corresponding to time information of the HOT CUE that is set in the music piece to be played by the DECK 2 are shown in the example illustrated in FIG. 3. In addition, an icon M4 corresponding to time information of the MEMORY CUE that is set in the music piece to be played by the DECK 3 and an icon M5 corresponding to time information of the MEMORY CUE that is set in the music piece to be played by the DECK 4 are also shown.

In the example illustrated in FIG. 3, the icons corresponding to the time information of the HOT CUE are alphabets enclosed by rectangles and the icons corresponding to the time information of the MEMORY CUE are triangular marks. However, the icons are not necessarily shown as in the example but may be of any form.

Icons each corresponding to one of the CUE POINTs are also displayed on the corresponding one of the waveforms E61 to E64 of the DECKs in the display area 302 in the same manner as in the display area 301.

In the display area 302 of the reservation-setting screen, the display controller 131 fixedly displays the waveform E71 of the music piece currently played by the DECK 1 and the waveforms E72 to E74 of the music pieces to be played by the DECKs 2 to 4, while displaying, on the fixed waveforms, the bar E75 indicating the current playback point while moving in accordance with the playback status. Consequently, a user can recognize the current playback status even during the process for setting a reservation in view of the movement of the bar E75 indicating the current playback point on the waveform E71 of the music piece currently played by the DECK 1 in accordance with the playback status.

It should be noted that the display controller 131, which is basically configured to fixedly display the waveforms E71 to E74 in the display area 302 of the reservation-setting screen, is configured to display the waveforms E71 to E74 in a manner moving in right and left directions (directions indicated by an arrow A3) in accordance with a user's operation. The bar E75 indicating the current playback point is displayed in motion in accordance with the playback status. Consequently, a user can recognize the current playback status even during the process for setting a reservation in view of the movement of the bar E75 indicating the current playback point on the waveform E71 of the music piece currently played by the DECK 1 in accordance with the playback status.

Also in the display area 301, the display controller 131 fixedly displays the waveform E61 of the music piece currently played by the DECK 1 and the waveforms E62 to E64 of the music pieces to be played by the DECKs 2 to 4, while displaying the bar E65 indicating the current playback point on the fixed waveforms of the music piece currently played by the DECK 1, while moving in accordance with the playback status.

A user can display the optimal part of the music pieces for setting a reservation in the display area 301 by, for instance, moving the waveforms E61 to E64 displayed in the display area 301 in right and left directions through the user's operation via the operation unit 120 to roughly select the playback point and then moving the waveforms E71 to E74 in right and left directions in the display area 302 where the enlarged images of the music pieces are displayed.

Subsequently, when receiving the user's operations on the respective operators in the display area 303, the display controller 131 displays correspondingly to the user's operations and the reservation unit 132 sets mixing points in the respective music pieces in accordance with the user's operations. The mixing point is set by, for instance, the following steps.

(1) Selecting Music Piece in which Mixing Point is to be Set

When a user's operation for selecting any one of the waveforms E61 to E64 in the display area 301 or any one of the waveforms E71 to E74 in the display area 302 is made, the display controller 131 changes a display mode of the waveform of the selected one of the music pieces in a manner distinguishable from the rest of the music pieces. The change in the display mode is made on, for instance, at least one of a type of display color, contrast density of the display color, color or monochrome display, type of background color, contrast density of the background color, with or without background color, blinking pattern, or with or without blinking. The reservation unit 132 determines that the selected music piece is a music piece where the mixing point is to be set.

(2) Selecting Start Point or End Point

When a user's operation for selecting the start-point setting button 52 or the end-point setting button 53 is made in the display area 303, the display controller 131 changes the display mode of the selected button. The display mode is changed in the same manner as in changing the display mode as described in (1). When the start-point setting button 52 is selected, the reservation unit 132 determines that a start point, i.e., a point for reserving mix-in for the music piece selected in (1) is to be set. When the end-point setting button 53 is selected, the reservation unit 132 determines that an end point, i.e., a point for reserving mix-out for the music piece selected in (1) is to be set.

(3) Setting Start Point or End Point

The start point or the end point is set, for instance, according to any one of the processes described below.

(3)-1 Setting by Direct Selection of CUE POINT

In a case where a CUE POINT is preset by a user, the start point or the end point is set by directly selecting the icon corresponding to the CUE POINT.

When one of the icons corresponding to the CUE POINT is directly selected, the display controller 131 changes the display mode of the selected one of the icons. The display mode is changed in the same manner as in changing the display mode as described in (1). The display controller 131 is optionally configured to, when a point near icons is selected, move the selected point to the closest icon.

Then, the reservation unit 132 sets the time information corresponding to the selected one of the icons as the start point or the end point.

For instance, a user can set the start point or the end point at a desired point based on the CUE POINT preset in a preparation work by selecting one of the icons M1 to M3 corresponding to the time information of HOT CUE and the icons M4 and M5 corresponding to the time information of MEMORY CUE as shown in the example illustrated in FIG. 3. Accordingly, even during a DJ performance, the reservation can be highly accurately and smoothly set in accordance with the combination of music pieces and atmosphere at the time.

(3)-2 Setting by Selecting Plural CUE POINTs Through Operation on Jump Buttons 54*a* and 54*b*

In a case where the CUE POINT is preset by a user, the start point or the end point can be set by selecting an icon corresponding to the CUE POINT through an operation on the jump buttons 54*a* and 54*b*.

When a user's operation is made on the jump buttons 54*a* and 54*b*, the display controller 131 changes the display mode of one of the icons, which is a possible reservation point, in accordance with the user's operation on the jump buttons 54*a* and 54*b*. The display mode is changed in the same manner as in changing the display mode as described in (1).

Then, the reservation unit 132 sets the time information corresponding to the selected one of the icons as the start point or the end point.

For instance, in the example illustrated in FIG. 3 where the icons M1 to M3 corresponding to the time information of the HOT CUE and the icons M4 and M5 corresponding to the time information of the MEMORY CUE are displayed, when a user's operation is made on the jump button 54*a* or 54*b*, the display controller 131 sequentially changes the display mode of the icons that are possible reservation points. As a result, the preset CUE POINT can be selected after sequentially skipping unnecessary point(s). The display mode is changed in the same manner as in changing the display mode as described in (1).

It should be noted that, in a case where both of HOT CUE(s) and MEMORY CUE(s) are set in advance, the HOT CUE and the MEMORY CUE are optionally treated in the same manner in accordance with the time information or optionally independently treated during the jumping process.

When the jumping process is completed, the reservation unit 132 sets the start point or the end point at the time information corresponding to one of the icons selected as the possible reservation point at this timing. The jumping process may be terminated in any manner. For instance, the jumping process is optionally determined to be completed when the setting button E55 in the display area 303 in FIG. 3 or a non-illustrated determination button is operated, when a music piece is newly selected in (1), or when a new start point or end point is selected in (2).

As in (3)-1, a user can set the start point or the end point at any desired point based on the CUE POINT set in advance in a preparation work. Accordingly, even during a DJ performance, the reservation can be highly accurately and smoothly set in accordance with the combination of music pieces and atmosphere at the time.

(3)-3 Setting by Directly Selecting Waveform

When a part of the waveform is directly selected, the display controller 131 changes the display mode of a part near the selected point. The display mode is changed in the same manner as in changing the display mode as described in (1). When a point of the waveform is selected, the display controller 131 is optionally configured to move the selected point to any one of beats, measures, and icons closest to the selected point.

Then, the reservation unit 132 sets the time information corresponding to the selected point as the start point or the end point.

A user can set the start point or the end point at any desired point even in a case where the CUE POINT is not set in advance in a preparation work, or even at a point where the CUE POINT is not set in advance.

(4) Displaying Details of Reservation

The display controller 131 changes the display contents in the display area 302 in accordance with the details of the reservation. FIGS. 4 to 7 illustrate examples of enlarged views of the display area 302.

Figure 4:
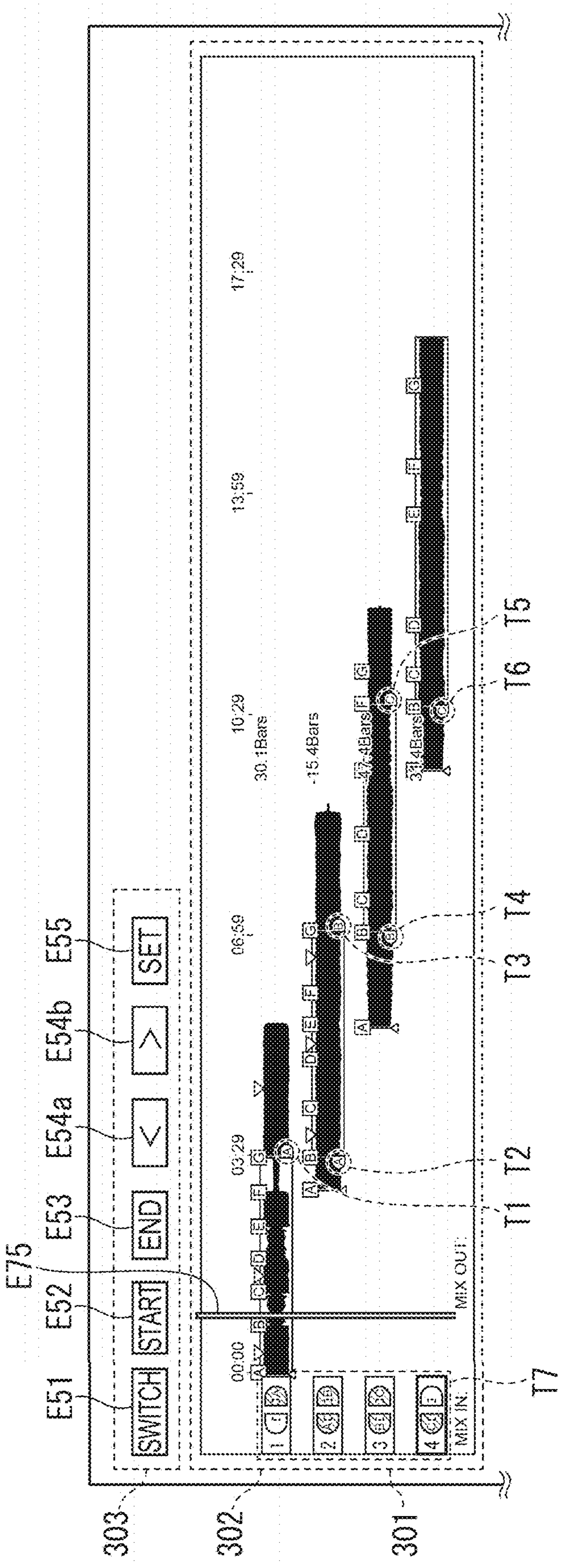
FIG. 4 schematically illustrates still another example of the display screen according to the exemplary embodiment of the invention.
Figure 5:
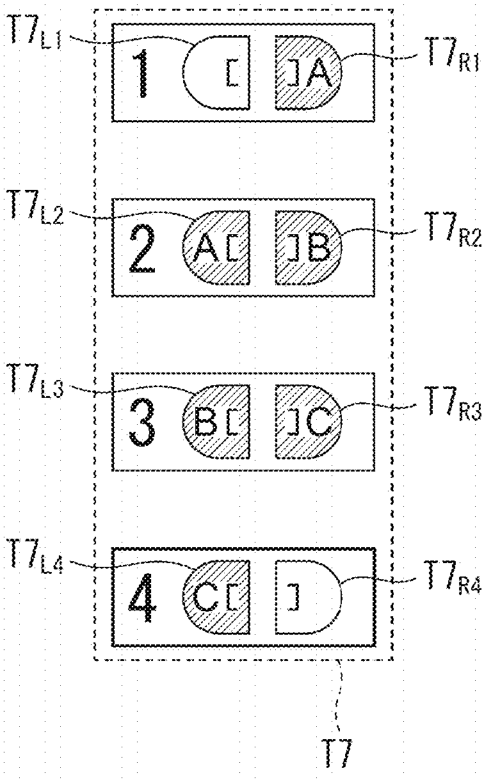
FIG. 5 schematically illustrates a further example of the display screen according to the exemplary embodiment of the invention.

The examples illustrated in FIGS. 4 and 5 shows an instance where the following series of reservations have been set.

Mix-out of the music piece currently played by the DECK 1 at a point "G" (HOT CUE)

Mix-in of the music piece played by the DECK 2 at a point "B" (HOT CUE)

Mix-out of the music piece played by the DECK 2 at a point "G" (HOT CUE)

Mix-in of the music piece played by the DECK 3 at a point "B" (HOT CUE)

Mix-out of the music piece played by the DECK 3 at a point "F" (HOT CUE)

Mix-in of the music piece to be played by the DECK 4 at a point "B" (HOT CUE)

As illustrated in FIG. 4, the display controller 131 displays information indicating a playback order in the display area 302. Examples of the information indicating the playback order include characters and icons representing the playback order. Alternatively, a plurality of images indicating the playback status of the music piece are optionally displayed in an arrangement in accordance with the playback order to provide the information indicating the playback order.

In the example illustrated in FIGS. 4, T1 to T7 are shown as the characters or icons representing the playback order. Icons T1 and T2, icons T3 and T4, and icons T5 and T6, which are respective combinations of a mix-out point of a first music piece and a mix-in point of subsequently played second music piece to be mixed with the first music piece, are marked with the same characters to show mutual correspondence therebetween.

Further, deck numbers and icons representing the playback order of each of the DECKs 1 to 4 are respectively displayed at left and right sides in an icon T7 as illustrated in FIG. 5. For DECK 1, an icon T7$_{L1}$ and an icon T7$_R$ respectively indicating the mix-in point and mix-out point are displayed. Similarly, T7$_{L2}$ and T7$_{R2}$, T7$_{L3}$ and T7$_{R3}$, and T7$_{L4}$ and T7$_{R4}$ are displayed for DECK 2, DECK 3, and DECK 4, respectively. Characters corresponding to the above-described icons T1 to T6 are displayed in the icons. In other words, the playback order is intensively and visually displayed in the icon T7.

A user can intuitively recognize the playback order by visually checking the above-described icons T1 to T7. Specifically, a user visually checks the relative arrangement of a plurality of images in a form of the waveforms indicating the playback status of the music pieces, whereby the user can intuitively recognize the playback order. Further, a user can check the playback order by sequentially tracking the correspondence and the order of the characters in the icon T7.

Figure 6:
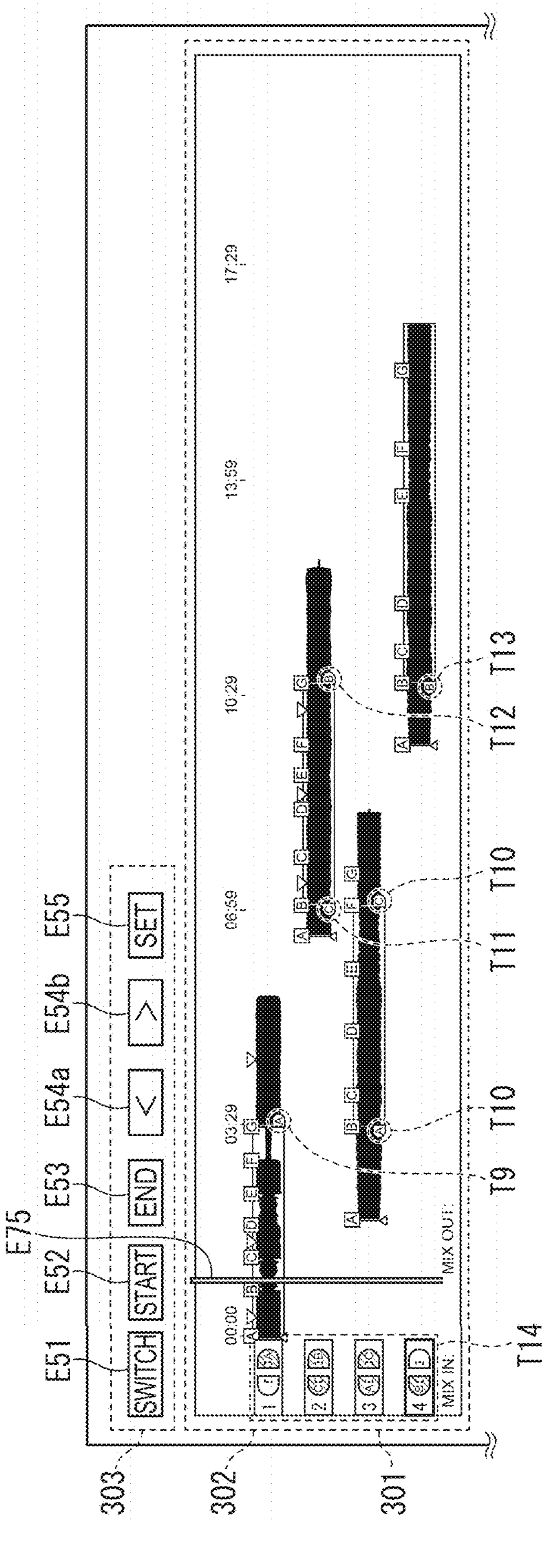
FIG. 6 schematically illustrates a still further example of the display screen according to the exemplary embodiment of the invention.
Figure 7:
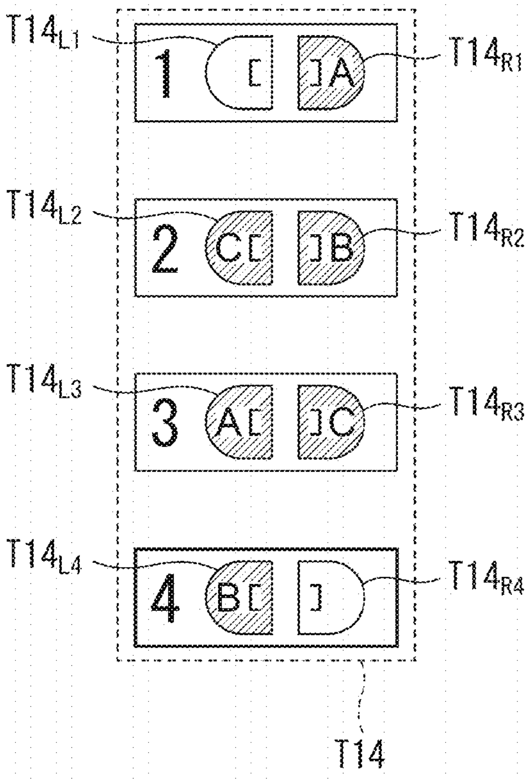
FIG. 7 schematically illustrates a still further example of the display screen according to the exemplary embodiment of the invention.

The examples illustrated in FIGS. 6 and 7 shows an instance where the following series of reservations have been set.

Mix-out of the music piece being played by the DECK 1 at a point "G" (HOT CUE)

Mix-in of the music piece played by the DECK 3 at a point "B" (HOT CUE)

Mix-out of the music piece played by the DECK 3 at a point "F" (HOT CUE)

Mix-in of the music piece played by the DECK 2 at a point "B" (HOT CUE)

Mix-out of the music piece played by the DECK 2 at a point "G" (HOT CUE)

Mix-in of the music piece played by the DECK 4 at a point "B" (HOT CUE)

In the example illustrated in FIG. 6, icons T8 to T14 are displayed in place of the icons T1 to T7 described with respect to FIG. 4. Icons T8 and T9, icons T10 and T11, and icons T12 and T13, which are respective combinations of a mix-out point of a first music piece and a mix-in point of subsequently played second music piece to be mixed with the first music piece, are marked with the same characters to show mutual correspondence therebetween.

Further, deck numbers and icons representing the playback order of each of the DECKs 1 to 4 are respectively displayed at left and right sides in an icon T14 as illustrated in FIG. 7. For DECK 1, an icon T14$_{L1}$ and an icon T14$_R$ respectively indicating the mix-in point and mix-out point are displayed. Similarly, T14$_{L2}$ and T14$_{R2}$, T14$_{L3}$ and T14$_{R3}$, and T14$_{L4}$ and T14$_{R4}$ are displayed for DECK 2, DECK 3, and DECK 4, respectively. Characters corresponding to the above-described icons T8 to T13 are displayed in the icons. In other words, the playback order is intensively and visually displayed in the icon T14.

A user can intuitively recognize the playback order by visually checking the above-described icons T8 to T14. Specifically, a user visually checks the relative arrangement of a plurality of images in a form of the waveforms indicating the playback status of the music pieces, whereby the user can intuitively recognize the playback order. Further, a user can check the playback order by sequentially tracking the correspondence and the order of the characters in the icon T14.

Especially, even in a case such as the example illustrated in FIGS. 6 and 7 where the playback order is not arranged in the order of the number of the DECKs, a user can intuitively recognize the playback order.

It should be noted that, though enlarged images of parts of the display area 301 are displayed in parallel in the display area 302 in the example illustrated in FIG. 3, two or more images of waveforms with different magnifications are optionally displayed in a switching manner as in the usual playback screen. For instance, a screen corresponding only to the display area 301 illustrated in FIG. 3 and a screen corresponding only to the display area 302 illustrated in FIG. 3 are optionally displayed in a switching manner. Alternatively, only one of the above screens is optionally displayed. Further, a zooming ratio in each of the screens is optionally suitably determined and the screens are optionally suitably switched in response to a user's operation through the operation unit 120.

As described above, the waveform of the music piece to be assigned with the mixing point is fixedly displayed in the reservation-setting screen, whereas the bar indicating the playback point of the currently played music piece is displayed in motion in accordance with the current playback point. Accordingly, even while a certain music piece is being played, a user can accurately set the mixing points for the currently played music piece and the rest of the music pieces and can recognize the playback status of the music piece even during setting the reservation.

Figure 8:
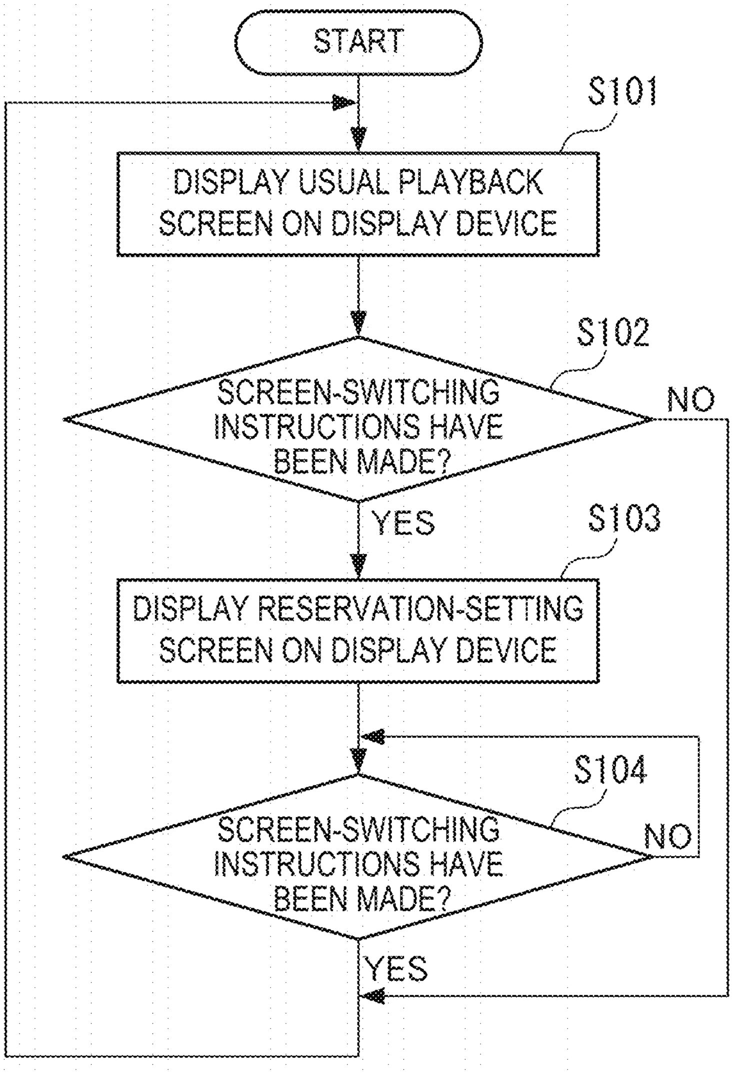
FIG. 8 is a flowchart illustrating a control method according to an exemplary embodiment of the invention.

FIG. 8 is a flowchart illustrating operations of components for displaying screens related to a process for setting a reservation for mixing music pieces.

In the example illustrated in FIG. 8, the display controller 131 initially displays the usual playback screen on the display device 110 (Step S101). Then, while the usual playback screen is displayed on the display device 110 during a usual playback process, whether a user's operation indicating screen-switching instructions is made via the operation unit 120 is determined (Step S102). When it is determined that the user's operation indicating the screen-switching instructions is not made even after a predetermined time has elapsed (Step S102: NO), the process returns to Step S101.

In contrast, when it is determined that a user's operation indicating the screen-switching instructions has been made (Step S102: YES), the display controller 131 displays the reservation-setting screen on the display device 110 (Step S103). In other words, the display controller 131 changes the display contents on the display device 110 from the playback screen to the reservation-setting screen.

Next, while the reservation-setting screen is displayed on the display device 110, whether a user's operation indicating screen-switching instructions is made via the operation unit 120 is determined (Step S104). When it is determined that the user's operation indicating the screen-switching instructions is made (Step S104: YES), the process returns to Step S101, where the display controller 131 again displays the usual playback screen on the display device 110. In other words, the display controller 131 restores the display contents on the display device 110, specifically, changes the reservation-setting screen to the playback screen). As a result, the waveform of the currently played music piece is displayed in motion whereas the waveforms of the rest of the music pieces are fixedly displayed, whereby a user can intuitively recognize the progress of the currently played music piece.

It should be noted that the user's operation for the screen-switching instructions, which is basically made through a user's operation on the screen-switching button 51, is optionally made based on a user's operation of other kind. For instance, the user's operation for the screen-switching instructions is optionally determined to have been made when a user's operation corresponding to instructions for starting setting the reservation is performed.

Further, with regard to the mixing process using DECKs 1 to 4, though a process for setting a reservation for sequentially mixing the music pieces to be played by the DECKs 2 to 4 with the music piece being played by the DECK 1 is described in the above example, the same applies to a process for sequentially mixing the music pieces to be played by the DECKs 1 to 4 with the music piece being played by the DECKs 2 to 4. Music pieces being simultaneously played by two or more DECKs are also similarly sequentially mixed with the music pieces to be played by one or more of the DECKs 1 to 4.

Next, a playback screen displayed when reservation has been set (referred to as a "reservation-execution screen" hereinafter) will be described below.

Figure 9:
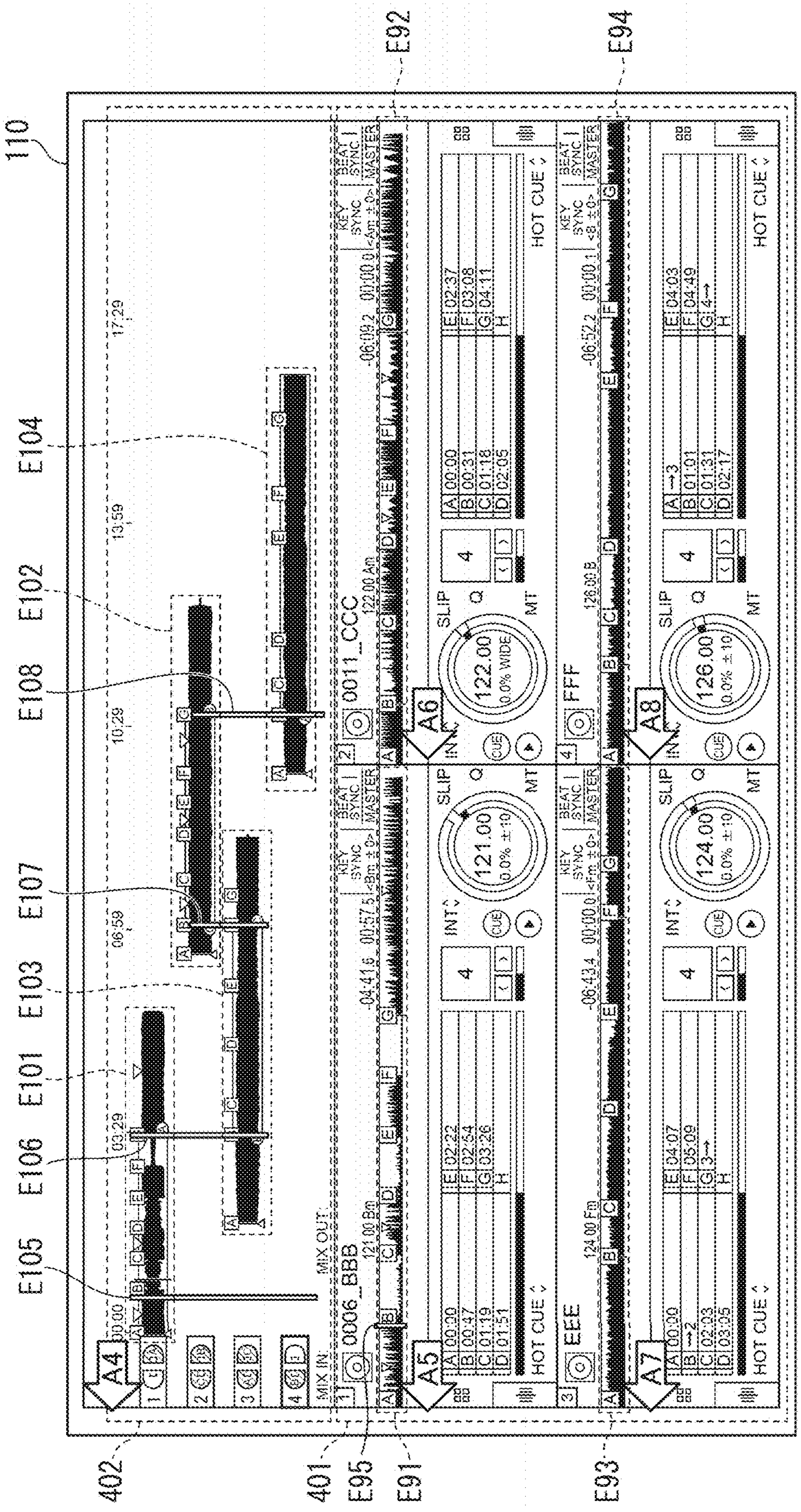
FIG. 9 schematically illustrates a still further example of the display screen according to the exemplary embodiment of the invention.

FIG. 9 illustrates an example of the reservation-execution screen. With a reservation being already set, when it is commanded to display a playback screen by a user's operation for selecting the screen-switching button 51, the display controller 131 displays the reservation-execution screen illustrated in FIG. 9 on the display device 110.

Accordingly, a user can check a usual playback status based on the playback screen illustrated in FIG. 2, can set a reservation for audio mixing based on the reservation-setting screens illustrated in FIGS. 3 to 7, and check the playback status after reservation has been set based on the reservation-execution screen illustrated in FIG. 8.

Reservation-Execution Screen that is Playback Screen Displayed after Reservation for Mixing is Set With a reservation being already set, when it is commanded to display a playback screen by a user's operation of selecting the screen-switching button 51, the display controller 131 displays the reservation-execution screen illustrated in FIG. 9.

The reservation-execution screen illustrated in FIG. 9 includes a display area 401 indicating information on an entirety or a part of the music piece and a display area 402 indicating a part of the display area 401 in an enlarged manner. An example in which the music piece is played based on the reservation that is set as described with respect to FIGS. 6 and 7 (i.e. execute the reservation) will be described below.

A waveform E91 (third image) of an entirety or a part of the music piece currently played by the DECK 1 illustrated in FIG. 9, waveforms E92 to E94 of an entirety or a part of the music pieces to be played by the DECKs 2 to 4, and a bar E95 that is an image (fourth image) indicating the playback point of the music piece currently played are shown in the display area 401. It should be noted that an image (third image) in a form of a bar or the like indicating the determined mixing point is optionally shown on the waveforms E91 to E94.

Images displayed in the display area 402 include an enlarged image in a form of a waveform E101 (first image) of a part of the waveform E91 of the music piece currently played by the DECK 1 displayed in the display area 401, enlarged images in a form of waveforms E102 to E104 of the music pieces to be played by the DECKs 2 to 4 displayed in the display area 401, an image in a form of a bar E105 (second image) indicating the current playback point of the music piece being played by the DECK 1, and images in a form of bars E106 to E108 (third image) indicating the reserved mixing points.

In the display area 402 on the reservation-execution screen, the display controller 131 fixedly displays the bar E105, which is an image indicating the current playback point of the music piece currently played by the DECK1, at a predetermined position and displays the waveform E101 in a manner moving in a left direction on the screen (i.e. direction indicated by an arrow A4) based on the fixed bar E105 in accordance with the current playback point. At this time, the bar E106 indicating the mixing point is also displayed in a manner moving in the left direction on the screen (the direction indicated by the arrow A4) in accordance with the current playback point as in the waveform E101. Consequently, a user can locate the current playback point of the music piece and, at the same time, the mixing point(s) in view of the movement of the waveform E101 of the currently played music piece in accordance with the playback status.

In contrast, the waveforms 102 to 104 of the music pieces on which the reservation is set are also displayed in a manner moving in the left direction on the screen (the direction indicated by the arrow A4) based on the bar E105 fixedly displayed. At this time, the display controller 131 moves the waveform 101 of the music piece being currently played by the DECK 1, the waveforms E102 to E104 of the music pieces to be played by the DECKs 2 to 4 on which the reservation is set, and the images in a form of the bars E106 to 108 indicating the mixing points in accordance with the playback status of the music piece being currently played by the DECK 1 while keeping mutual positional relationships therebetween.

It should be noted that, in an example illustrated in FIGS. 6 and 7, the playback start points of the music pieces of the DECKs 2 to 4, on which reservation has been set, are set at the start points of the music pieces. Accordingly, the display controller 131 displays the waveforms E102 to E104 of the music pieces of the DECKs 2 to 4, on which reservation has been set, (i.e. a side timewise later than the bar E105 indicating the current playback point) in a manner moving from the right side of the screen toward the image in a form of the bar E105 indicating the current playback point. Consequently, the waveforms E102 to E104 of the music pieces to be played by the DECKs 2 to 4, on which reservation has been set, are displayed in motion before the current playback point reaches the determined playback start points. In other words, the waveforms E102 to E104 of the music pieces on which reservation has been set are displayed on the display screen as if the music pieces are started being played from a minus side.

The display controller 131 is optionally configured to display the display area 401 in the same manner as the display area 402. For instance, the display controller 131 is optionally configured to display the waveform E91 of the music piece being played by DECK 1 in a manner moving in the left direction on the screen (i.e. direction indicated by an arrow A5) based on the fixedly displayed bar E95 in accordance with the current playback point. Further, the display controller 131 is optionally configured to display the waveforms E92 to E94 of the music pieces of the DECKs 2 to 4, on which reservation has been set, in a manner moving in the left direction on the screen (direction indicated by arrows A6 to A8) based on a point corresponding to the above-described fixedly displayed bar E95.

It should be noted that, though enlarged images of parts of the display area 401 are displayed in parallel in the display area 402 in the example illustrated in FIG. 9, two or more images of waveforms with different magnifications are optionally displayed in a switching manner as on the usual playback screen and the reservation-setting screen. For instance, a screen corresponding only to the display area 401 illustrated in FIG. 9 and a screen corresponding only to the display area 402 illustrated in FIG. 9 are optionally displayed in a switching manner. Alternatively, only one of the above screens is optionally displayed. Further, a zooming ratio in each of the screens is optionally suitably determined and the screens are optionally suitably switched in response to a user's operation through the operation unit 120.

As described hereinabove, on the reservation-execution screen that is the playback screen displayed when the reservation has been set, the waveform of the music piece being played is displayed in motion in accordance with the playback status as on the usual playback screen. The waveform(s) of the music piece(s), in which reservation has been set, is displayed in motion in conjunction with the currently played music piece in accordance with the reserved mixing point(s), unlike the usual playback screen and the reservation-setting screen. In other words, the waveform(s) of the music piece(s) in which reservation has been set is displayed in motion in the same manner as in playing a music piece in a usual manner, by moving the waveform(s) from a point before the music piece is played (i.e. a point before audio output: a point in the future).

Accordingly, a user can intuitively recognize that a reservation has been set only by checking whether the waveform(s) of the music piece(s) in which reservation has been made is in motion. A user can also grasp a required time until the reserved mixing point and a required time until the playback start point in accordance with the mixing point by checking a positional relationship between the image in a form of the bar indicating the current playback point and the image in a form of the bar indicating the mixing point. Further, the display area 402, in which information before and after the playback point can be checked in detail, is useful in supporting a user's DJ performance and the like.

It should be noted that, though the playback start point in accordance with the mixing point is determined at the start of the music pieces to be played by the DECKs 2 to 4 in setting reservation in the above example, the invention is suitably applicable to an instance where an intermediary part of a music piece (e.g. the playback point corresponding to the CUE POINT, which is in the middle of the music piece) is determined as the mixing point or the playback start point.

In this case, while the second to fourth playback units 134 to 136 performs the decoding process, the audio output unit 150 optionally outputs the audio information or does not output the audio information until the playback start point. In other words, the playback with the audio output may be performed or the playback without the audio output is optionally performed until the playback start point. In addition, whether the audio output is to be made can be optionally determined before reaching the playback start point. Such a setting is performed using, for instance, the setting button E55 in the display area 303 illustrated in FIG. 3.

Meanwhile, in accordance with the playback status of the music piece being played by the DECK 1, the display controller 131 moves the waveform of the music piece being played by the DECK 1, the image in a form of the bar indicating the determined mixing point, and the waveforms of the music pieces to be played by the DECKs 2 to 4, on which a reservation has been set, while keeping the mutual positional relationship therebetween, based on the image in a form of a bar indicating the current playback point. In other words, while the image in a form of the bar indicating the current playback point is fixedly displayed, the waveforms of the music pieces of the DECKs 2 to 4 in which reservation has been set are displayed on the display device 110 in motion in accordance with the current playback point based on the image indicating the current playback point. Consequently, the waveforms of the music pieces to be played by the DECKs 2 to 4 are displayed in a manner moving from the determined mixing point or a playback point before (in terms of time) the playback start point, thereby achieving the same advantages as those in the above-described example.

Though the waveform of the music piece is displayed in motion from a state before starting playback by executing reservation in the above example, such a display mode is optionally effected in accordance with a user's choice, thereby improving usability for the user.

It should be noted that the display controller 131 is optionally configured to display at least one of the following elements shown on the display screen in a different display mode (i.e. change the display mode of the waveform) so that the status of executing the reservation can be easily recognized by a user.

For instance, the display mode of the waveform is optionally differentiated between a part at which reservation has been executed and other parts of the waveform. In other words, the display controller 131 is optionally configured to change the display mode of the waveform to be displayed on the display device 110 when the current playback point reaches the mixing point or the playback start point.

The change in the display mode is made on, for instance, at least one of a type of display color, contrast density of the display color, color or monochrome display, type of background color, contrast density of the background color, with or without background color, blinking pattern, or with or without blinking.

Figure 10:
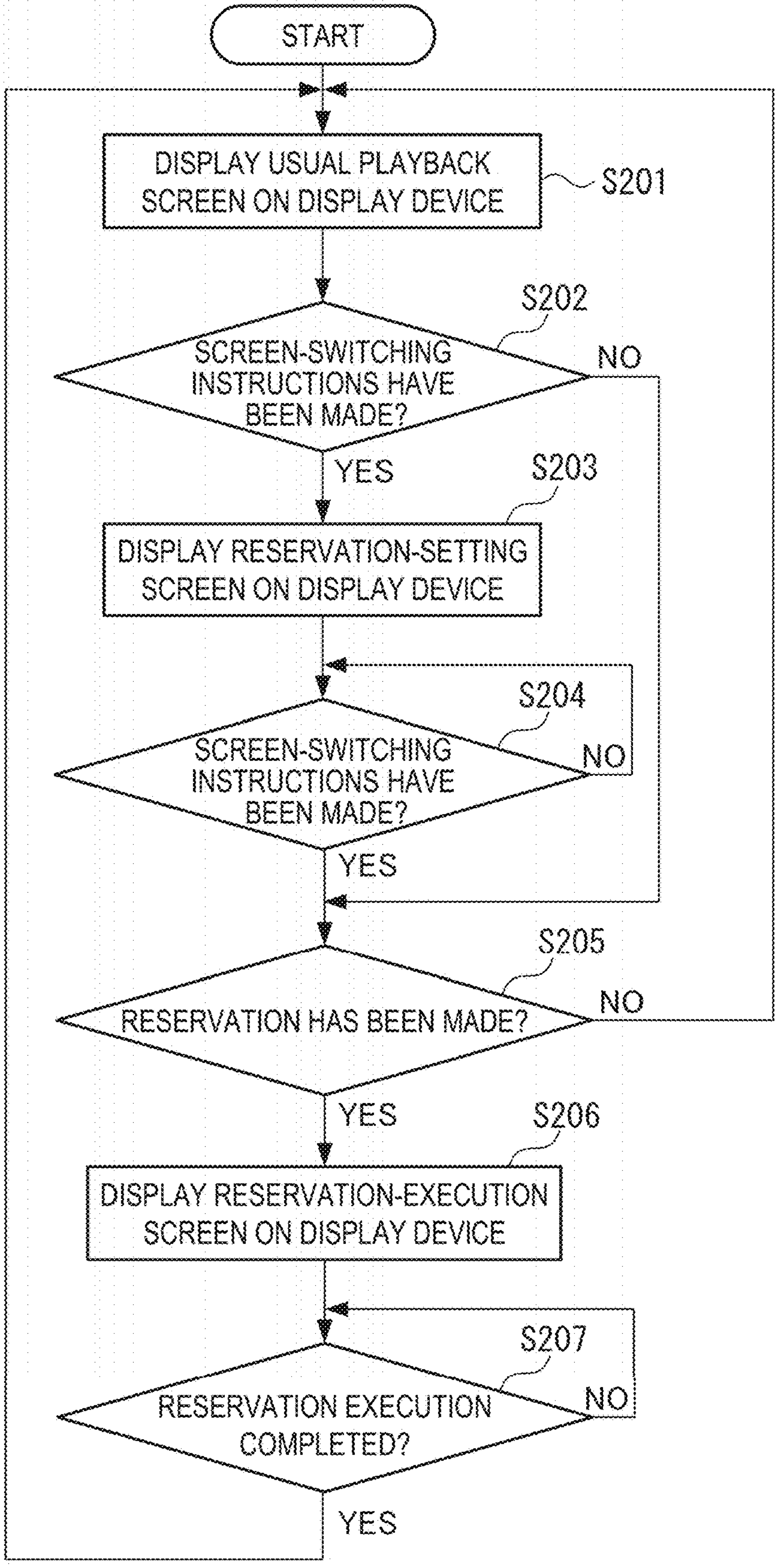
FIG. 10 is another flowchart illustrating the control method according to the exemplary embodiment of the invention.

FIG. 10 is a flowchart illustrating how the components operate in displaying the screens related to mixing of music pieces. Specifically. FIG. 10 is a flowchart illustrating an operation for displaying the reservation-execution screen, which is the playback screen displayed when reservation has been made, in addition to the operation for switching the playback screen and the reservation-setting screen described with respect to FIG. 8.

In the example illustrated in FIG. 10, the display controller 131 initially displays the usual playback screen on the display device 110 (Step S201). Then, while the usual playback screen is displayed on the display device 110 during a usual playback process, whether a user's operation indicating screen-switching instructions is made via the operation unit 120 is determined (Step S202). When it is determined that the user's operation indicating the screen-switching instructions is not made even after a predetermined time has elapsed (Step S202: NO), the process proceeds to later-described Step S205.

In contrast, when it is determined that a user's operation indicating the screen-switching instructions has been made (Step S202: YES), the display controller 131 displays the reservation-setting screen on the display device 110 (Step S203). In other words, the display controller 131 changes the display contents on the display device 110 from the playback screen to the reservation-setting screen.

Next, while the reservation-setting screen is displayed on the display device 110, whether a user's operation indicating screen-switching instructions is made via the operation unit 120 is determined (Step S204). When it is determined that the user's operation indicating the screen-switching instructions is made (Step S204: YES), whether the reservation has been made is determined (Step S205).

When it is determined that the reservation has not been made (Step S205: NO), the process returns to Step S201. In other words, the display controller 131 restores the display contents on the display device 110, specifically, changes the reservation-setting screen to the usual playback screen).

In contrast, when it is determined that the reservation has been made (Step S205: YES), the display controller 131 displays the reservation-execution screen on the display device 110 (Step S206). In other words, the display controller 131 changes the display contents on the display device 110 from the reservation-setting screen to the reservation-execution screen.

Then, whether the reservation has been executed is determined (Step S207). When it is determined that the reservation has been executed (Step S207: YES), the process returns to Step S201, where the display controller 131 again displays the usual playback screen on the display device 110. In other words, the display controller 131 restores the display contents on the display device 110 back to the usual playback screen.

It should be noted that, when the process returns to Step S201 after executing the reservation and the display controller 131 again displays the usual playback screen on the display device 110, the display contents on the display device 110 transition from the reservation-execution screen to the usual playback screen. As a result, the waveform of the currently played music piece is displayed in motion whereas the waveforms of the rest of the music pieces are fixedly displayed, whereby a user can intuitively recognize the progress of the currently played music piece. At this time, the display mode of the waveform is optionally differentiated between a part at which a reservation has been executed and other parts of the waveform.

It should be noted that, though the waveform of the music piece being played is displayed in motion in accordance with the playback status at the time of executing the reservation as on the usual playback screen in the above-described example, a screen similar to the reservation-setting screen is optionally displayed. For instance, the waveform of the music piece being played and the image in a form of a bar (third image) indicating the mixing point may be fixedly displayed at the time of executing the reservation, whereas the bar indicating the playback point of the music piece being played may be displayed in motion in accordance with the current playback point. The contents of the screen to be displayed at the time of executing the reservation can be specified by a user to further improve usability for a user.

Further, with regard to the mixing process using DECKs 1 to 4, though a process for setting and executing the reservation for sequentially mixing the music pieces to be played by the DECKs 2 to 4 with the music piece being played by the DECK 1 is described in the above example, the same applies to a process for sequentially mixing the music pieces to be played by the DECKs 1 to 4 with the music piece being played by one of the DECKs 2 to 4. Music pieces being simultaneously played by two or more DECKs are also similarly sequentially mixed with the music pieces to be played by one or more of the DECKs 1 to 4.

In the above-described exemplary embodiment of the invention, the display controller 131 configured to display information on audio mixing on the display device and the reservation unit 132 configured to set the music pieces to be mixed and the playback start point in the music pieces are provided. The display controller 131 is configured to switchably display on the display device 110 the first screen, on which the first image indicating the playback status of the first music piece being played is moved based on the second image indicating the current playback point of the first music piece, and a second screen, on which the first image is fixedly displayed and the second image is moved based on the first image in accordance with the current playback point. Further, the second screen includes the reservation-setting screen related to the reservation unit 132. A reservation can be thus set without interrupting the playback of a music piece even while the music piece is being played. Accordingly, an acoustic device, a program, and a control method that enable a user to easily set a reservation even while a music piece is being played can be provided.

According to a typical technology, a reservation is roughly set, where a desired point at a last part of a currently played music piece and a desired point at a beginning part of a subsequently played music piece are defined as the mixing points. However, according to the exemplary embodiment of the invention, the reservation can be more easily set in accordance with the user's intention.

Especially, the waveform of the music piece to be assigned with the mixing point is fixedly displayed on the reservation-setting screen of the present exemplary embodiment unlike the usual playback screen, whereas the bar indicating the playback point of the music piece being played is displayed in motion in accordance with the current playback point. Accordingly, a user can easily and accurately set the mixing point for the music piece being played and other music pieces.

Though a reservation can be set in detail also in a typical reservation setting technology, it is necessary to open a setting screen independent of the playback screen in order to set a reservation, so that it is difficult to quickly set a reservation within a short time without interrupting the playback of the music piece while the music piece is being played. However, according to the exemplary embodiment of the invention, while the playback status is continuously and intuitively recognized, the reservation can be quickly set within a short time, so that users' demand for real-timeness and precision for setting a reservation, which is required for actual DJ performance, can be met. Further, user's burden for setting a reservation in mixing music pieces, which requires various settings, can be reduced.

According to the exemplary embodiment of the invention, the first image indicating the playback status of the music piece includes the music waveform. Accordingly, the status of setting and executing a reservation can be visually and easily presented to a user by moving or not moving the waveform and/or changing the mode of the motion in displaying the music waveform.

Further, according to the exemplary embodiment of the invention, the reservation unit 132 can set the playback start point in the music piece(s) to be mixed while playing the first music piece and the display controller 131 can switch the first screen and the second screen while the first music piece is being played. Accordingly, impromptu mixing of the music pieces is possible. Furthermore, even while a music piece is being played, it is possible to achieve highly immediate mixing without interfering with the playback of the music piece.

According to the exemplary embodiment of the invention, the display controller 131 displays information showing the playback order of two or more music pieces in the reservation-setting screen on the display device 110. Accordingly, the reservation status can be easily presented to a user, which is useful in supporting a DJ performance of a user.

Further, according to the exemplary embodiment of the invention, the display controller 131 displays the first screen on the display device 110 and moves the third image indicating the time information of the playback start point on the first screen based on the second image indicating the current playback point when the reservation set by the reservation unit 132 is to be executed.

Typically, the status of the determined reservation and the status of execution of the reservation are not easily recognized until the execution of the reservation (i.e. playing the music piece based on the determined reservation) is actually started, which sometimes causes anxiety to a user. However, according to the exemplary embodiment of the invention, whether the reservation has been set, details of the determined reservation, and the status of reservation execution can be easily presented to a user.

It should be noted that the "playback" in the invention, which is described as a series of processes of generating the audio signals by the decoding process of the first to fourth playback units 133 to 136 and outputting the audio signals by the audio output unit 150 as the audio information in the above-described exemplary embodiment, is not necessarily defined as in the exemplary embodiment. For instance, the invention is also applicable when the "playback" is defined as a process until the audio signals are generated through the decoding process by the first to fourth playback units 133 to 136.

The image indicating the time information of a music piece, which is exemplified by the music waveform in the above-described exemplary embodiment, is not necessarily in a form of the music waveform in the invention. For instance, a bar indicating the playback point, an image indicating a numeral(s), and/or a combination of the bar and the numeral is usable as the image indicating the time information of the music piece.

It should be noted that the display screens described in the first exemplary embodiment are merely exemplary and are not limited to those described in the present exemplary embodiment in terms of the elements, design, arrangement, and the like. Further, the elements, design, arrangement, and the like of the display screen may be determined by a user.

The display of the invention, which is exemplified by the display device 110 having a rectangular visible area to be seen by a user in the above-described exemplary embodiment, is not necessarily configured as in the exemplary embodiment. For instance, the invention is also applicable to a display device having a circular visible area to be seen by a user. Examples of the display device having a circular visible area to be seen by a user include a display device provided at the center of a jog dial of a DJ instrument. Such a display device, whose visible area is usually smaller than the display device 110 having a rectangular visible area to be seen by a user, is optionally configured to display limited information or further display additional information. The invention is also applicable to a display device having a visible area, which is not rectangular or circular, to be seen by a user.

Further, the invention, which is applied to the acoustic device 100 having one display device 110 in the above-described exemplary embodiment, is optionally applied to an acoustic device 100 having two or more display devices. For instance, the invention is applicable to an acoustic device and the like having the display device provided at the center of the jog dial of the above-described DJ instrument, as a sub-display device on each of the DECKs 1 to 4.

The invention is applicable not only to an acoustic device such as a DJ instrument and DJ application but also to a streaming service using a music application software and/or the Internet and the like. In this case, the invention is applicable to, for instance, an automatic playback using a playlist or the like.

The acoustic device, which is a 4-channel acoustic device including four DECKs 1 to 4 in the above exemplary embodiment, is optionally, for instance, a 2-channel acoustic device or an acoustic device having five or more channels for achieving the same functionality. In addition, the invention is applicable not only to a DJ instrument but also to a typical mixer, electronic music instrument, and acoustic device such as DAW (Digital Audio Workstation) and DTM (Desk Top Music).

Suitable exemplary embodiments of the invention have been detailed above with reference to the attached drawings. However, the scope of the invention is not limited to the exemplary embodiments. It would be obvious for those skilled in the art to which the invention pertains that various modifications and revisions are conceivable within the technical idea described within claims, and it is understood that such modifications and revisions are naturally within the technical scope of the invention.

The invention claimed is:

1. An acoustic device configured to mix two or more music pieces, the acoustic device comprising:

a display controller configured to display information related to mixing of the music pieces on a display device; and a reservation unit configured to set the music pieces to be mixed and a playback start point in each of the music pieces, wherein the display controller is configured to switchably display on the display device a first screen, on which a first image indicating a playback status of a first music piece being played of the music pieces is moved based on a second image indicating a current playback point of the first music piece, and a second screen, on which the first image is fixedly displayed and the second image is moved based on the first image in accordance with the current playback point, and the second screen comprises a reservation-setting screen related to the reservation unit.

2. The acoustic device according to claim 1, wherein the first image comprises an image indicating a music waveform of the first music piece.

3. The acoustic device according to claim 1, wherein the reservation unit is capable of setting the playback start point of each of the music pieces to be mixed while the first music piece is being played, and the display controller is capable of switching the first screen and the second screen while the first music piece is being played.

4. The acoustic device according to claim 1, wherein the reservation unit is configured to set a mixing point on each of the two or more music pieces and set the playback start point in accordance with the mixing point.

5. The acoustic device according to claim 1, wherein the display controller is configured to display information indicating a playback order of the two or more music pieces in the reservation-setting screen on the display device.

6. The acoustic device according to claim 5, wherein the display controller is configured to display a character or an icon representing the playback order as the information indicating the playback order on the display device.

7. The acoustic device according to claim 6, wherein the first image indicates a music waveform of the first music piece, and the display controller is configured to display on the display device the character or the icon representing the playback order and being provided at the playback start point and a playback end point on the music waveform of each of the music pieces, as the information indicating the playback order.

8. The acoustic device according to claim 5, wherein the display controller is configured to display a plurality of images respectively indicating playback statuses of the two or more music pieces on the display device in an arrangement corresponding to the playback order to display the information indicating the playback order.

9. The acoustic device according to claim 1, wherein the reservation unit is capable of setting whether to output sounds of the music pieces to be mixed before reaching the playback start point.

10. The acoustic device according to claim 1, wherein the display controller is configured to, in execution of a reservation set by the reservation unit, display the first screen on the display device and move a third image indicating time information of the playback start point based on the second image on the first screen.

11. A non-transitory computer-readable storage medium storing a program configured to cause a computer to function as the acoustic device according to claim 1.

12. The acoustic device according to claim 1, wherein the first screen comprises a playback screen on which a playback status of at least one of the two or more music pieces is displayed, or a reservation-execution screen on which a playback status of at least one of the two or more music pieces for which the playback start point has been set by the reservation unit is displayed.

13. A control method executed using an acoustic device configured to mix two or more music pieces, the control method comprising:

displaying information related to mixing of the two or more music pieces on a display device; and setting the music pieces to be mixed and a playback start point in each of the music pieces, wherein in the displaying of the information, a first screen, on which a first image indicating a playback status of a first music piece being played of the music pieces is moved based on a second image indicating a current playback point of the first music piece, and a second screen, on which the first image is fixedly displayed and the second image is moved based on the first image in accordance with the current playback point, are switchably displayed on the display device, and the second screen comprises a reservation-setting screen related to the setting of the music pieces and the playback start point.

14. The control method according to claim 13, wherein the first screen comprises a playback screen on which a playback status of at least one of the two or more music pieces is displayed, or a reservation-execution screen on which a playback status of at least one of the two or more music pieces for which the playback start point has been set is displayed.

15. The control method according to claim 13, wherein the first image indicates a music waveform of the first music piece, and in the displaying of the information, information indicating a playback order of the two or more music pieces is displayed in a form of a character or an icon representing the playback order and being provided at the playback start point and a playback end point on the music waveform of each of the music pieces.

* * * * *